US012700263B2

(12) United States Patent
Fasoli et al.

(10) Patent No.: US 12,700,263 B2
(45) Date of Patent: Aug. 4, 2026

(54) VERIFICATION OF LIVENESS DATA FOR IDENTITY PROOFING

(71) Applicant: Apple Inc., Cupertino, CA (US)

(72) Inventors: Gianpaolo Fasoli, Burlingame, CA (US); Tal Tversky, Austin, TX (US); Vinay Sharma, Palo Alto, CA (US); Hubert Greiche, San Jose, CA (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 18/103,487

(22) Filed: Jan. 30, 2023

(65) Prior Publication Data

US 2024/0071141 A1     Feb. 29, 2024

Related U.S. Application Data

(60) Provisional application No. 63/402,433, filed on Aug. 30, 2022.

(51) Int. Cl.
*G06V 40/40*          (2022.01)
*G06V 20/40*          (2022.01)
*G06V 40/20*          (2022.01)

(52) U.S. Cl.
CPC .............. *G06V 40/40* (2022.01); *G06V 20/48* (2022.01); *G06V 40/20* (2022.01)

(58) Field of Classification Search
CPC ...... G06V 20/48; G06V 40/172; G06V 40/20; G06V 40/40; G06V 20/49; G06V 40/168; G06V 40/171; G06V 40/70; G06F 18/21; G06F 18/22; G10L 17/10; G10L 17/22; H04N 21/44008
See application file for complete search history.

(56) References Cited

U.S. PATENT DOCUMENTS

| | | | |
|---|---|---|---|
| 2021/0209606 A1* | 7/2021 | Herlands | ............ G06Q 20/4016 |
| 2021/0327431 A1* | 10/2021 | Stewart | ................. G06V 40/45 |
| 2021/0344675 A1 | 11/2021 | Cui et al. | |

OTHER PUBLICATIONS

Verdoliva, Luisa. "Media forensics and deepfakes: an overview." IEEE journal of selected topics in signal processing 14.5 (2020): 910-932. (Year: 2020).*
Agrawal et al., "White-Box Cryptography with Global Device Binding from Message-Recoverable Signatures and Token-Based Obfuscation," Sep. 2021, retrieved from https://eprint.iacr.org/archive/2021/747/20210609:062330, 36 pages.
Markus, "pico.js, a face-detection library in 200 lines of JavaScript," Apr. 2018, retrieved from https://nenadmarkus.com/p/picojs-intro/, 9 pages.

(Continued)

*Primary Examiner* — Michael J Vanchy, Jr.
(74) *Attorney, Agent, or Firm* — BAKERHOSTETLER

(57) ABSTRACT

Aspects of the subject technology include receiving, by a first device and from a second device, a video of a first subject and indications of one or more select frames from the video, selecting one or more additional frames from the video, generating a first confidence score that the video was captured in a single take based on the one or more select frames and the one or more additional frames, generating a request for proofing an identity of the first subject, and transmitting the request for proofing the identity to a third device. The request for proofing an identity may include the first confidence score.

20 Claims, 7 Drawing Sheets

(56)        References Cited

OTHER PUBLICATIONS

Mcquillan, "Is lip-reading the secret to security?" Biometric Technology Today, Jun. 2019, pp. 5-7.
International Search Report and Written Opinion from PCT/US2023/030642, dated Dec. 7, 2023, 15 pages.

* cited by examiner

100

VERIFICATION SERVER

104

NETWORK

108

102

IDENTITY ISSUING SERVER

106

303

102

300

302 304 306 308 310 312 314 316 318 320 322 324 326 328

Gesture

301

302 304 306 308 310 312 314 316 318 320 322 324 326 328

330

500

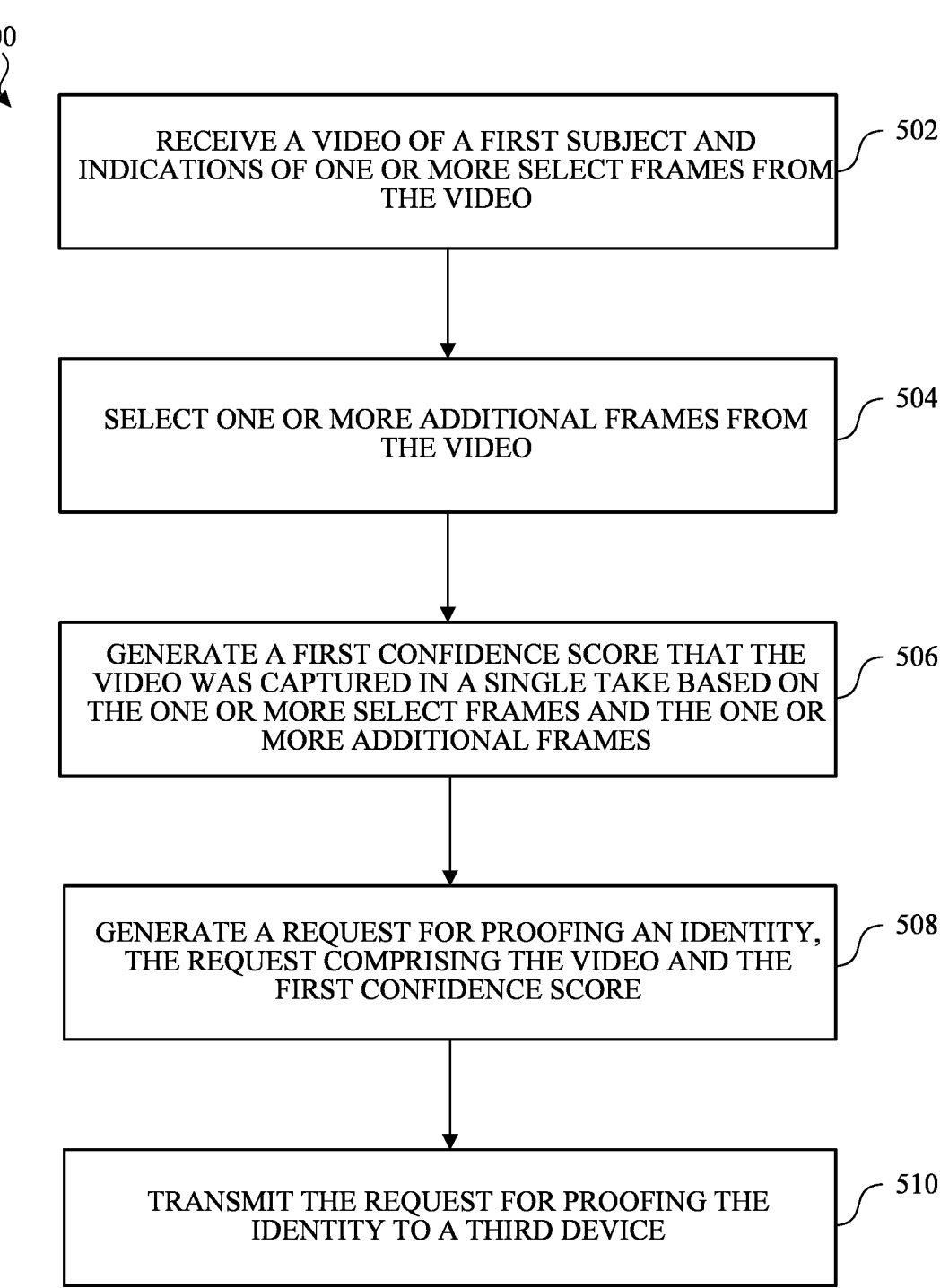

RECEIVE A VIDEO OF A FIRST SUBJECT AND INDICATIONS OF ONE OR MORE SELECT FRAMES FROM THE VIDEO — 502

SELECT ONE OR MORE ADDITIONAL FRAMES FROM THE VIDEO — 504

GENERATE A FIRST CONFIDENCE SCORE THAT THE VIDEO WAS CAPTURED IN A SINGLE TAKE BASED ON THE ONE OR MORE SELECT FRAMES AND THE ONE OR MORE ADDITIONAL FRAMES — 506

GENERATE A REQUEST FOR PROOFING AN IDENTITY, THE REQUEST COMPRISING THE VIDEO AND THE FIRST CONFIDENCE SCORE — 508

TRANSMIT THE REQUEST FOR PROOFING THE IDENTITY TO A THIRD DEVICE — 510

ACCESS A VIDEO OF A FIRST SUBJECT PERFORMING A GESTURE — 602

SELECT ONE OR MORE SELECT FRAMES FROM THE VIDEO — 604

TRANSMIT VIDEO AND INDICATIONS OF THE ONE OR MORE SELECT FRAMES TO A SECOND DEVICE — 606

RECEIVE AN IDENTIFICATION PROVISIONED FOR THE FIRST DEVICE BY A THIRD DEVICE — 608

BIND THE IDENTIFICATION TO THE FIRST DEVICE — 610

700

VERIFICATION OF LIVENESS DATA FOR IDENTITY PROOFING

CROSS-REFERENCE TO RELATED APPLICATIONS

The present application claims the benefit of U.S. Provisional Patent Application Ser. No. 63/402,433, entitled "VERIFICATION OF LIVENESS DATA FOR IDENTITY PROOFING," filed Aug. 30, 2022, which is hereby incorporated herein by reference in its entirety and made part of the present U.S. Utility patent application for all purposes.

TECHNICAL FIELD

The present description generally relates to identity proofing and, more particularly, to verification of liveness data for identity proofing.

BACKGROUND

Identity proofing may be the process of providing sufficient information (e.g., identity history, credentials, documents) to establish an identity. An electronic device such as a laptop, tablet, or smartphone, may be configured to collect such information. For example, identification information may include a video of the user performing a gesture, an image of the user, an image of a state-issued identification of the user, and the like.

BRIEF DESCRIPTION OF THE DRAWINGS

Certain features of the subject technology are set forth in the appended claims. However, for the purpose of explanation, several implementations of the subject technology are set forth in the following figures.

FIG. 5 depicts a flow diagram of an example process for identity proofing, in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In a digital identification (ID) provisioning process, such as by and/or in conjunction with a governmental entity (such as a state entity), an electronic device may send a proofing request that includes user-related information (e.g., liveness/gesture, images of user identification documents, and images of a user). Based on the proofing request, and/or other factors, the state authority may determine to further review the proofing request, reject the proofing request, or automatically proceed to provision the digital ID on the user's device (e.g., via digital wallet application). After the governmental authority authorizes the provisioning of the digital ID on the user device, a key pair may be generated by the user device (e.g., in the secure enclave) that is used to anchor the provisioned digital ID to that particular device.

The subject technology provides an intermediary layer between the user device and the governmental entity that analyzes the user-related information provided by the user device to generate one or more confidence scores regarding the validity of the user-related information. For example, the subject technology may verify liveness data (e.g., a video of a user performing a gesture) to confirm that the liveness data was not tampered with. The one or more confidence scores generated by the subject technology may be provided to the governmental entity in conjunction with the proofing request in order to provide the governmental entity with additional information that may be used by the governmental entity in determining whether to provision the digital ID on the user's device.

Figure 1:
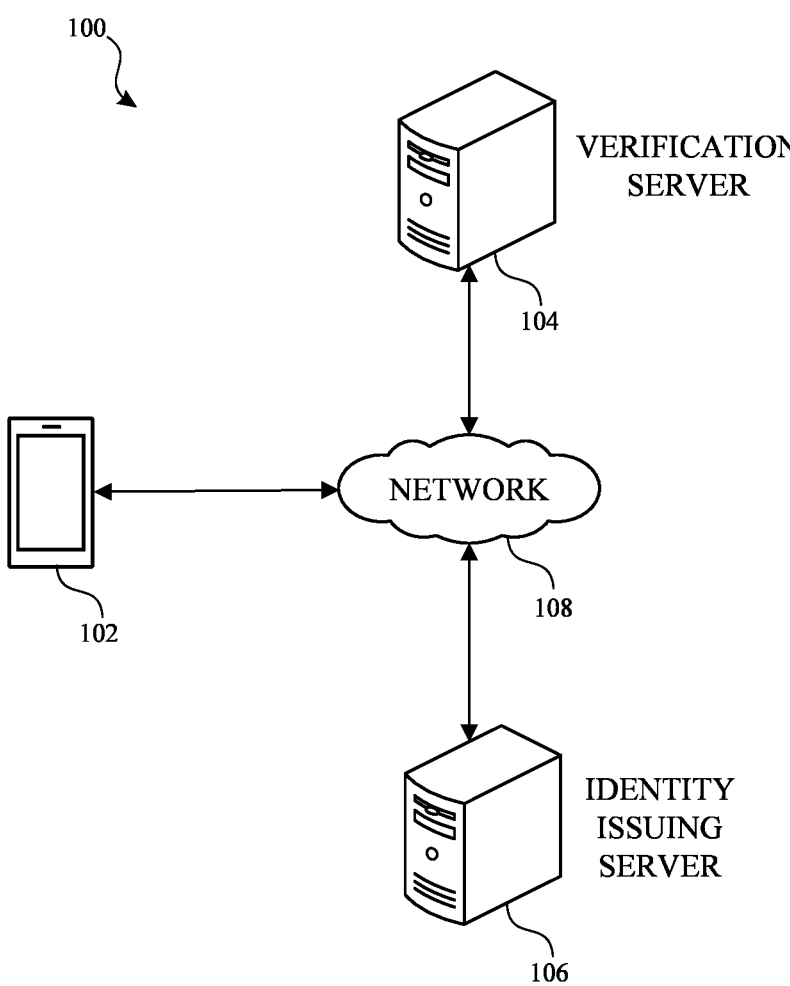
FIG. 1 illustrates an example network environment for identity proofing and/or identification provisioning, in accordance with one or more implementations.

FIG. 1 illustrates an example network environment 100 for identity proofing and/or identification provisioning, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include a user device 102, a verification server 104, and an identity issuing server 106. The network 108 may communicatively (directly or indirectly) couple the user device 102, the verification server 104, and/or the identity issuing server 106. In one or more implementations, the network 108 may be an interconnected network of devices that may include, or may be communicatively coupled to, the Internet. For explanatory purposes, the network environment 100 is illustrated in FIG. 1 as including the user device 102, the verification server 104, the identity issuing server 106, and the network 108; however, the network environment 100 may include any number of electronic devices and/or any number of servers communicatively coupled to each other directly or via the network 108.

The user device 102 may be, for example, a desktop computer, a portable computing device such as a laptop computer, a smartphone, a peripheral device (e.g., a digital camera, headphones), a tablet device, standalone videoconferencing hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the user device 102 is depicted as a smartphone. The user device 102 may be, and/or may include all or part of, the electronic system discussed below with respect to FIG. 7. In one or more implementations, the user device 102 may include a camera for capturing video and image data and a microphone for capturing audio data.

The verification server 104 may perform operations for managing the secure exchange of data between various electronic devices (e.g., the user device 102, the verification server 104, and/or the identity issuing server 106), such as when sending a proofing request. In some variations, the verification server 104 includes one or more app-specific modules (e.g., plugins) that perform operations for a respective application (e.g., a digital wallet application). In some variations, the verification server 104 includes one or more push modules for providing asynchronous notifications to one or more electronic devices (e.g., publish-subscribe messaging). In one or more implementations, the verification server 104 may store account information (e.g., account, handles, or any other account-specific data) associated with the user device 102. In one or more implementations, the verification server 104 may provide content (e.g., forms, provisioned digital IDs) that is to be processed at the user device 102 by an application or operating system of the user device 102.

The identity issuing server 106 may correspond with a governmental entity (such as a state entity) and may issue digital IDs. The identity issuing server 106 may perform operations for managing the secure exchange of data between various electronic devices (e.g., the user device 102, the verification server 104, and/or the identity issuing server 106), such as when provisioning a digital ID. In some variations, the identity issuing server 106 includes one or more app-specific modules (e.g., plugins) that perform operations for a respective application (e.g., an ID provisioning application). In some variations, the identity issuing server 106 includes one or more push modules for providing asynchronous notifications to one or more electronic devices (e.g., publish-subscribe messaging). In one or more implementations, the identity issuing server 106 may access government records (e.g., driver's license images, vehicle registrations, or any other government records) associated with the user of the user device 102. In one or more implementations, the identity issuing server 106 may provide content (e.g., forms, provisioned digital IDs) that is to be processed at the user device 102 by an application or operating system of the user device 102.

In a digital ID provisioning process, such as by and/or in conjunction with a governmental entity (such as a state entity), user device 102 may be configured to store an identification (e.g., a state-issued driver's license) of a user and keep the user's personal information secure, such as in the form of an applet provisioned on a secure element of the device. To add an identification to the user device 102, the user may use the user device 102 to capture one or more images of a physical identification (e.g., a state-issued driver's license card). The images may be evaluated (e.g., for quality) to help ensure that the images are acceptable by the state issuing authority (e.g., identity issuing server 106). Once the evaluation is made, the images may be sent to the verification server 104 and/or identity issuing server 106 (e.g., a state issuing authority).

The user may also use the user device 102 to record a gesture (e.g., facial and/or head movements) for assessing the liveness and/or the identity of the user. The gesture shows that the user requesting a digital ID is a living person and the person that the user claims to be. The recording of the gesture is evaluated (e.g., by the user device 102 and/or the verification server 104) to help reduce the risk of someone who is not the user using an image, video, or mask to try to improperly receive the user's identification. The verification server 104 may analyze the video of the gesture to generate a confidence score that the video was not manipulated and/or that the video represents the user (e.g., based on an image of the user). In one or more implementations, results from the analysis of the gesture (e.g., the confidence score) may be sent to the identity issuing server 106, but not the video of the gesture itself.

The user may further use the user device 102 to take an image of the user (e.g., a selfie). The image of the user may be compared (e.g., by the user device 102) with the likeness of the subject of other user data (e.g., the image of the state-issued driver's license card and/or the video of the gesture) that will be submitted to the identity issuing server 106 (e.g., via the verification server 104) to further help ensure that the person who submitted the user data was actually the user. Once the comparison is made, the image may be sent to the identity issuing server 106 (e.g., via the verification server 104) to be compared against another image of the user on record (e.g., a database of driver's license image on the identity issuing server 106).

Figure 2:
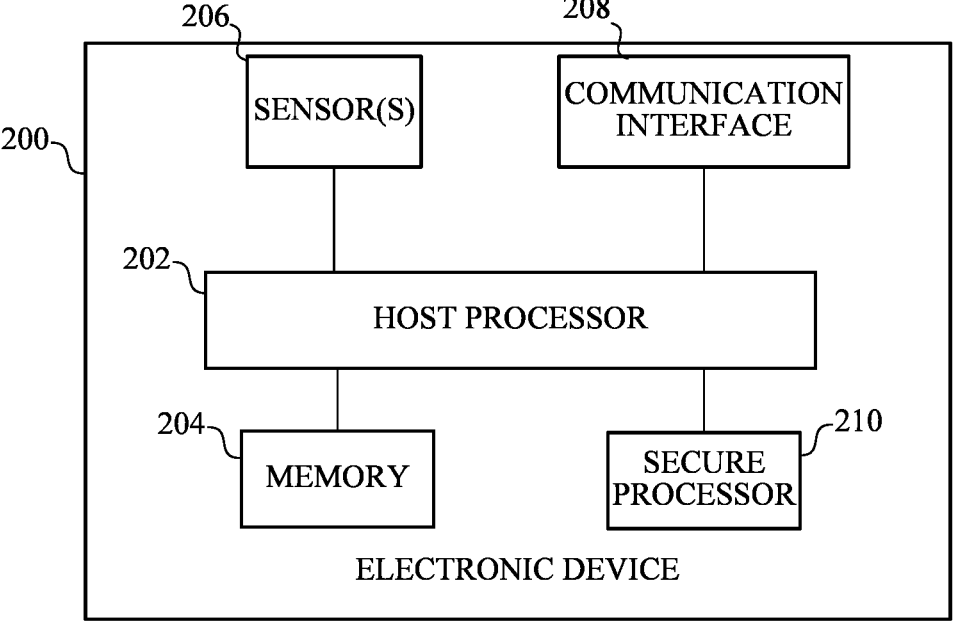
FIG. 2 depicts an example electronic device that may implement the subject methods and systems, in accordance with one or more implementations.

FIG. 2 depicts an electronic device 200 that may implement the subject technology, in accordance with one or more implementations. For explanatory purposes, FIG. 2 is primarily described herein with reference to the user device 102 of FIG. 1. However, this is merely illustrative, and features of the electronic device 200 of FIG. 2 may be implemented in any of the verification server 104, the identity issuing server 106, and/or any other electronic device for implementing the subject technology. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The electronic device 200 may include one or more of a host processor 202, a memory 204, one or more sensor(s) 206, a communication interface 208, and/or a secure processor 210. The host processor 202 may include suitable logic, circuitry, code, and/or machine-readable instructions that enable processing data and/or controlling operations of the electronic device 200. In this regard, the host processor 202 may be enabled to provide control signals to various other components of the electronic device 200. The host processor 202 may also control transfers of data between various portions of the electronic device 200. The host processor 202 may further implement an operating system or may otherwise execute code to manage operations of the electronic device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store ID provisioning session data processing identity proofing data (e.g., images and videos). The memory 204 may further store account information and any other type of identifier that associates the electronic device 200 with its corresponding user account and/or provisioned digital ID.

In one or more implementations, the memory 204 may also include machine learning models or rule-based models that are trained and configured for detecting a user's identity and/or specific gestures. In some implementations, each of the machine learning model or rule-based models may be trained to detect, identify, and/or classify an identity, orientation, location, position, movement, and/or the like of a specific body part (e.g., torso, face, eyes, head, hand, etc.) of an image subject, responsive to sensor signals received from a sensor (e.g., a camera) as input(s). The memory 204 may include information representing predefined gestures to which an input representing a gesture performed is compared for gesture detection purposes.

The sensor(s) 206 may include one or more microphones and/or cameras. The microphones may be used to facilitate the audio features of an identity proofing process. For example, the microphones may obtain audio signals corresponding to the voice of the user for determining a match between the obtained audio signals and audio signals from a video. The cameras may be used to facilitate the visual features of an identity proofing process. For example, the cameras may obtain images (e.g., a plurality of frames of a video) of the face of a user while the user is instructed to perform a gesture.

The communication interface 208 may include suitable logic, circuitry, and/or code that enables wired or wireless communication, such as between the electronic device 200 and another electronic device (e.g., the verification server 104 and/or the identity issuing server 106). The communication interface 208 may include, for example, one or more of a Bluetooth communication interface, an NFC interface, a Zigbee communication interface, a WLAN communication interface, a USB communication interface, a cellular interface, or generally any communication interface.

The secure processor 210 may be or include a secure enclave processor and/or a secure element. In one or more implementations, the secure processor may include both a secure enclave processor and a secure element as separate components. The secure enclave and/or the secure element of the secure processor 210 may store security information such as biometric information, passwords, PIN codes, and the like. Additionally, the secure enclave and/or the secure element of the secure processor 210 may store provisioned digital IDs (e.g., as provided by the identity issuing server 106). The provisioned digital IDs may be bound to the electronic device 200 so that they cannot be copied to other devices.

In one or more implementations, one or more of the host processor 202, the memory 204, the sensor(s) 206, the communication interface 208, the secure processor 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3A:
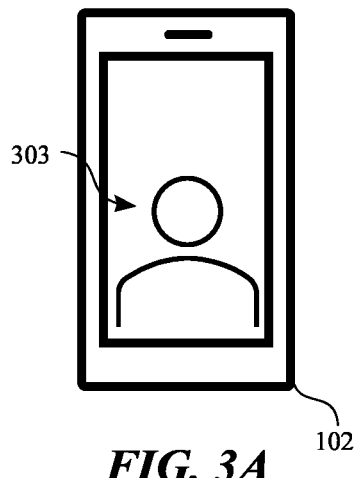
FIG. 3A depicts an image of a user, in accordance with one or more implementations.
Figure 3B:
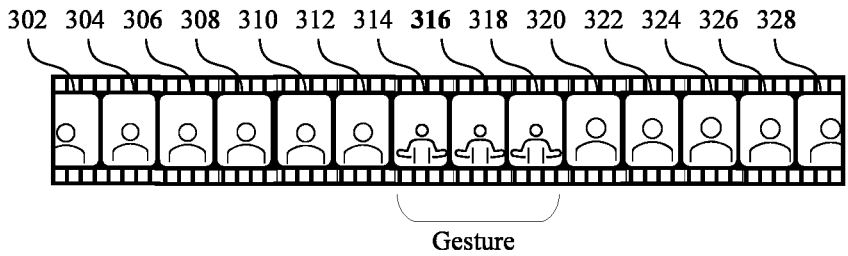
FIG. 3B depicts a timeline of a video, in accordance with one or more implementations.
Figure 3C:
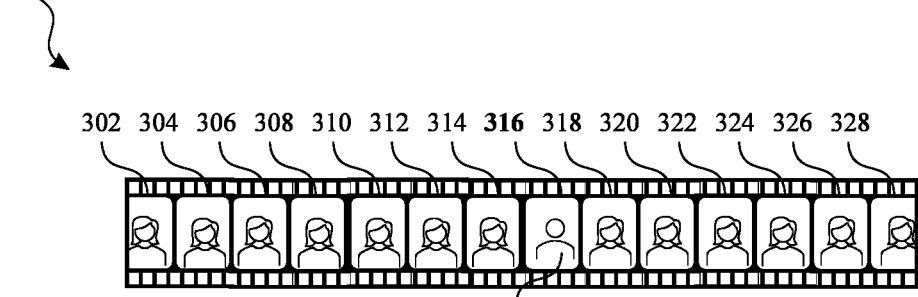
FIG. 3C depicts a timeline of a stitched video, in accordance with one or more implementations.

FIGS. 3A-3C depict the aspects of a video stitch detection process. In a digital ID provisioning process, such as by and/or in conjunction with a governmental entity (such as a state entity), an electronic device may send a proofing request that includes a series of assessments, such as a liveness/gesture assessment. A liveness/gesture assessment may require the user to upload a video of the user performing a gesture. The subject technology provides a heightened security bar for identity proofing in a digital ID provisioning process by determining whether the video from the user has been stitched (e.g., spliced with another image and/or video) to help reduce the risk of the user using an image, video, or mask to try to receive someone else's identification.

For explanatory purposes, the FIGS. 3A-3C are primarily described herein with reference to the devices shown and described with regard to FIGS. 1 and 2. However, the concepts shown in FIGS. 3A-3C are not limited to components or devices described in FIGS. 1 and 2 and may be performed by one or more other components and/or by other suitable devices.

FIG. 3A depicts an image 303 of a user, in accordance with one or more implementations. The image 303 of the user may be a still image, video frame, selfie, or any other kind of image data representing the user. The image 303 may include a subject, such as the user. The image 303 may clearly show the face of the user of the image. For example, the image 303 may be taken by a user-facing camera of the user device 102 (e.g., a selfie).

FIG. 3B depicts a timeline of a video 300, in accordance with one or more implementations. The video 300 includes one or more frames 302, 304, 306, 308, 310, 312, 314, 316, 318, 320, 322, 324, 326, 328 (collectively, the frames 302-328). The video 300 may have a subject, such as the user, that is performing a gesture. The image 303 and/or the video 300 may be captured by an electronic device (e.g., the user device 102). An electronic device (e.g., the user device 102) may compare the image 303 and one or more frames of the video 300 to determine whether they contain the same subject. An electronic device (e.g., the user device 102) may also identify the frames in which the user is gesturing that may be used for comparing with the still image of the user.

For example, after capturing the image 303, the user captures the video 300 using the user device 102 of the user performing a hand gesture. The user device 102 may compare the image 303 and the video 300 and determine that the subject of the image 303 and the subject of the video 300 are the same. The user device 102 may also determine that frames 314, 316, 318 show the user performing a gesture. The user device 102 may select one or more of the frames 314, 316, 318 to send to the verification server 104 for generating a proofing request.

FIG. 3C depicts a timeline of a stitched video 301, in accordance with one or more implementations. A malicious user may identify one or more frames of a video that will be compared with a still image (e.g., by the verification server 104) for generating a proofing request. The malicious user may obtain a still image of a target user they are attempting to impersonate and then may obtain a video (e.g., of the malicious user) and stitch it with the image, video, or mask of the target user at the location of the identified frames to try to obtain the target user's identification in the digital ID provisioning process. Thus, if the still image of the target user is compared with the identified frames of the video in which the malicious user injected an image of the target user, the comparison will not detect that the remainder of the video is actually of the malicious user, not the target user. This way, the malicious user only needs an image of the user, which may be easily obtained, and inject the image into a video at an identified location to trick a digital ID provisioning process into approving assessments involving visual identification data provided by a user.

For example, the malicious user may determine that the frame 316 in a video will be selected for analysis in generating a proofing request. The malicious user may take a video 301, the subject of which may be the malicious user. Because the subject of the video 301 does not match the subject of the image 303, the proofing request would be rejected. However, because the malicious user knows which frame of the video will be used for analysis, the malicious user may swap frame 316 with an image 330 of the target (e.g., the user), whose subject does match the subject of the image 303 (or may simply be a copy of the image 303), so that when the video 301 is analyzed (e.g., by the verification server 104) the assessments that compare the video 301 and the image 303 of the user will return a false positive. The subject technology prevents the malicious user from obtaining the digital ID in this way by analyzing the video to determine at least whether the video 301 has been altered and generating a confidence score corresponding to the likelihood that the video is unaltered. The confidence score provides the governmental entity some assurance that the video is likely unaltered without providing additional user information to the governmental entity during a request for a digital ID.

Figure 4:
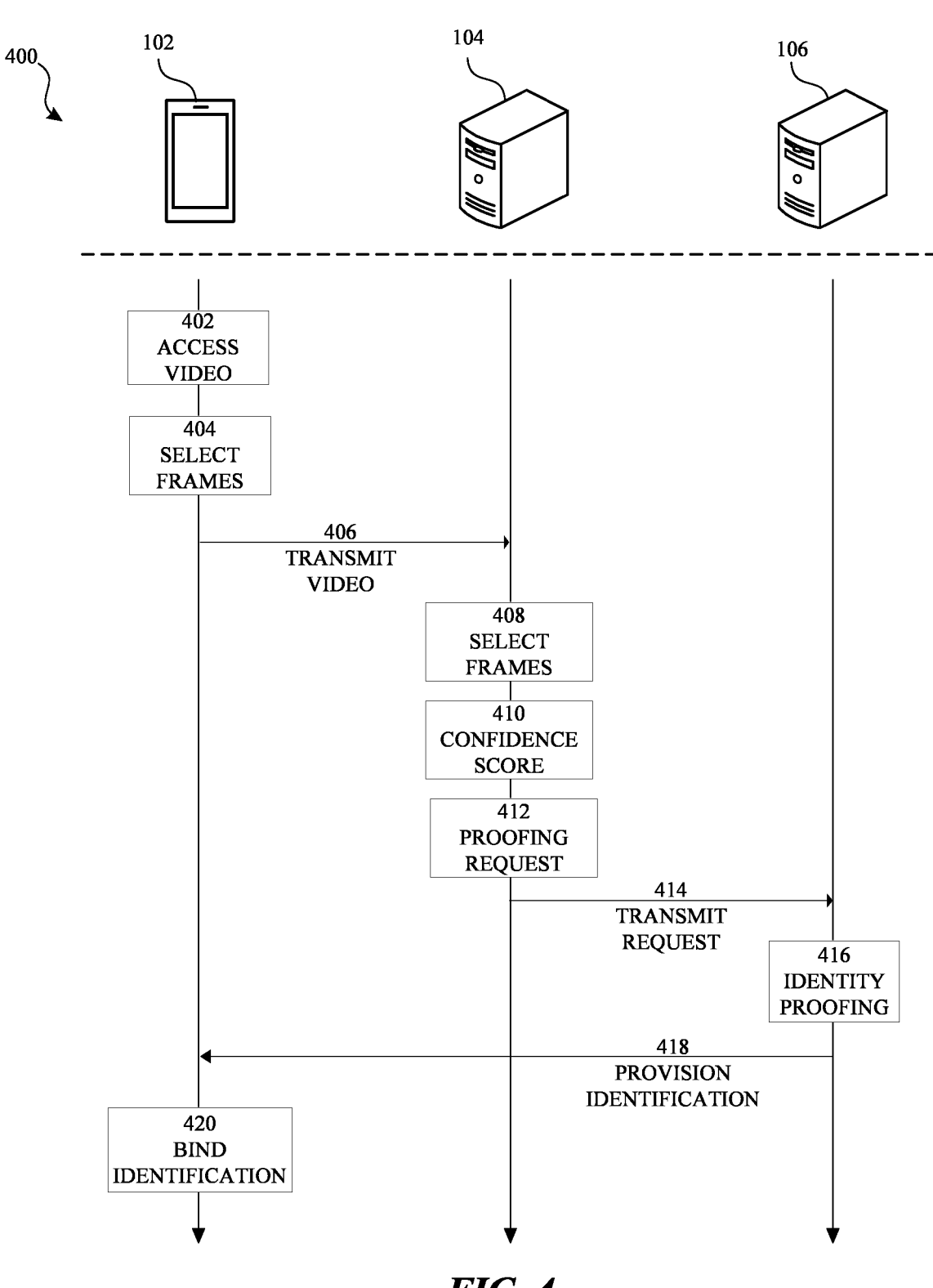
FIG. 4 depicts a sequence diagram of an example sequence for identity proofing and identification provisioning, in accordance with one or more implementations.

FIG. 4 depicts a sequence diagram of a sequence 400 for identity proofing and ID provisioning, in accordance with one or more implementations. For explanatory purposes, the sequence 400 is primarily described herein with reference to the devices shown and described with regard to FIGS. 1 and 2. However, the sequence 400 is not limited to components or devices described in FIG. 4, and one or more blocks (also referred to as steps, sequences, or operations) of the sequence 400 may be performed by one or more other components and/or by other suitable devices. In addition, the blocks of the sequence 400 need not be performed in the order shown and/or one or more blocks of the sequence 400 need not be performed and/or can be replaced by other operations.

At block 402, the user device 102 may access a video of the user performing a gesture. For example, the user device 102 may first present the user with an instruction to perform a gesture such as a hand movement, head movement, facial movement, or any other kind of movement. The user device 102 records a video of the user performing the gesture and accesses the video from local or remote storage. In one or more implementations, the user device 102 may take an image of the user (e.g., a selfie), store the image in local and/or remote memory, and access the image.

At block 404, the user device 102 may select one or more frames from the video for analysis. In one or more implementations, the user device 102 may automatically select frames of the video that clearly present the face of the user in the video. For example, the user device 102 may include a machine learning model that is trained to identify a face in an image based on training data containing labeled images of facial features, and the machine learning model may output the frames and/or indications of the frames (e.g., frame numbers or time stamps) of the video most clearly depicting a face. In the case where frames of the video are output, the selected frames may be converted to indications of the selected frames, such as frame numbers or time stamps, to reduce the amount of data that will be transmitted.

At step 406, the video and indications of the one or more select frames may be transmitted to the verification server 104. In one or more implementations, the user device 102 may also transmit the image to the verification server 104 for determining whether the subject from the video and the subject from the image match.

At block 408, the verification server 104 may select one or more additional frames from the video. The additional frames may be randomly selected at the server from the video or from portions of the video in which the face of the first subject is identified. Indications of the additional frames may be added to the indications of the select frames. The additional frames may be distinct from the indications of the one or more select frames. That is, the additional frames and the select frames may be disjoint sets of frames, and/or may randomly be overlapping. In one or more implementations, the additional frames may only be selected from frames that show a face of the first subject. In one or more implementations, the additional frames may be at least a threshold time between each other. Similarly, the additional frames may also be at least a threshold time from a select frame so that the additional frames are not too similar (e.g., adjacent) to the select frames.

At block 410, the verification server 104 generates a first confidence score indicating a likelihood that the video was taken in a single take, e.g., that the video was not tampered with. In one or more implementations, the verification server 104 may compare one or more of the select frames with one or more of the additional frames to generate a level of confidence that the video was captured in a single take, discussed further below with respect to FIG. 5.

In some implementations, the verification server 104 may also generate a second confidence score indicating a likelihood that a subject in a still image and a subject of the video are the same person. In such implementations, the verification server 104 may receive an image of the user from the user device 102. The image may be a selfie and/or an image of the user's physical identification (e.g., a driver's license card). The verification server 104 utilizes an identity model that receives as input an image and a video and generates as output a level of confidence that the subject of the image and the subject of the video are matching, discussed in more detail below with respect to FIG. 5.

At block 412, the verification server 104 generates a request for proofing an identity. The proofing request may include the first confidence score, the second confidence score, and/or one or more images of the user (e.g., the selfie and the image of the physical identification). With the proofing request, the identity issuing server 106 compares the one or more images of the user to images in its database to verify the identity of the user.

At step 414, the verification server 104 transmits the proofing request to the identity issuing server 106. In one or more implementations, the proofing request includes a level of confidence that the verification server 104 believes that the video and/or images received from the user device 102 correspond to a live person with the same likeness as that from an image of the user (e.g., from an image of the user on the user's driver's license or a selfie of the user). In one or more implementations, the proofing request also includes the image of the user for the identity issuing server 106 to compare to state records, such as a driver's license database.

At block 416, the identity issuing server 106 receives the proofing request. The identity issuing server 106 may compare one or more of the images of the user included in the proofing request with an image of the user in a database of the identity issuing server 106 (e.g., images captured when the user applied for a physical identification card such as a driver's license) to determine whether the person requesting the digital ID with the proofing request is the same person that owns the ID. The identity issuing server 106 may decide to further review the proofing request, reject the proofing request, or proceed to provision the digital ID. If the identity issuing server 106 proceeds to provision the digital ID, the process moves to step 418.

At step 418, the identity issuing server 106 transmits the data representing the provisioned digital ID to the user device 102. In one or more implementations, the data representing the digital ID may first be sent to the verification server 104 and then to the user device 102.

At block 420, the provisioned digital ID may be bound to the user device 102. After the identity issuing server 106 provisions the digital ID, a cryptographic key pair is generated by the user device 102 (e.g., via the secure element of the secure processor 210) that binds the provisioned digital ID to that specific device. For example, the key pair may include a public and a private key, and the public key may be sent to the identity issuing server 106 to include as part of the digital ID.

FIG. 5 depicts a flow diagram of a process 500 for identity proofing, in accordance with one or more implementations. For explanatory purposes, the process 500 is primarily described herein with reference to the user device 102, verification server 104, and/or identity issuing server 106 of FIG. 1. However, the process 500 is not limited to the user device 102, verification server 104, and/or identity issuing server 106, and one or more blocks of the process 500 may be performed by one or more other components of the verification server 104, and/or by other suitable devices. Further, for explanatory purposes, the blocks of the process 500 are described herein as occurring sequentially or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, a video of a first subject and indications of one or more select frames from the video are received by the verification server 104. As described in more detail with regard to FIG. 6, a user device 102 may access the video and generate the indications of the one or more select frames from the video. The video depicts the first subject (e.g., the user of the user device 102). In one or more implementations, the video includes the first subject performing a gesture. The gesture may be a hand movement, head movement, facial movement, or any other kind of movement. The indications of the one or more select frames may include timestamps, hashes, features, or any other form of data that represents the one or more select frames. In one or more implementations, the indications of the one or more select frames may be cross-referenced with the video to derive the select frames.

At block 504, one or more additional frames from the video may be selected by the verification server 104. The additional frames may be randomly selected from the video or from portions of the video in which the face of the first subject is identified. Selecting additional random frames may increase the entropy within the digital ID provisioning process and may make it more difficult for a malicious user to identify which frames of the video are to be analyzed. Indications of the additional frames may be added to the indications of the select frames. The additional frames may be distinct from the indications of the one or more select frames. That is, the additional frames and the select frames may be disjoint sets of frames.

In one or more implementations, the additional frames may only be selected from frames that show a face of the first subject. The verification server 104 and/or the user device 102 may include a machine-learning-based, rules-based, and/or computer-vision-based model trained to detect, identify, and/or classify, orientation, position, and/or movement of one or more body parts (e.g., eyes, face, hand) of the first subject. Based on one or more of such models, the verification server 104 and/or the user device 102 may process multiple frames of the video to identify a face of the first subject. The additional frames may be one or more of the frames in which the face of the first subject is identified.

In one or more implementations, the additional frames may be at least a threshold time between each other. For example, to prevent the random selection of frames from resulting in selecting adjacent frames, which are likely to be nearly identical, a time buffer may be considered such that any pair of additional frames are spaced apart from each other by an amount according to the time buffer. Similarly, the additional frames may also be at least a threshold time from a select frame so that the additional frames are not too similar (e.g., adjacent) to the select frames.

At block 506, a first confidence score is generated by the verification server 104. The first confidence score represents a level of confidence that the video was captured in a single take, and more particularly that the video was captured in a single, continuous instance of time. The first confidence score may be based on the one or more select frames and the one or more additional frames. The verification server 104 may compare one or more of select frames with one or more of the additional frames to determine whether there are any frames among the one or more select frames and the one or more additional frames that are different from the others (e.g., that the video was stitched with another video). For example, the verification server 104 may identify frames that contain a different subject, background, motion trajectories, and/or any other feature of the frames. The verification server 104 may also or instead compare the one or more select frames and the one or more additional frames of the video with an image of the user (e.g., a selfie). The verification server 104 may generate a confidence level based on the comparison. For example, the confidence level may be generated such that it is decreased as the number of frames that do not appear to match the other frames and/or image of the user increases.

In one or more implementations, a stitching model may be utilized to generate the first confidence score. The stitching model may include a machine learning model based on one or more types of supervised machine learning models (e.g., Artificial Neural Networks (ANN), Convolution Neural Networks (CNN), Recurrent Neural Networks (RNN), and Residual Neural Network) or unsupervised machine learning models (e.g., hierarchical, k-means, and Gaussian mixture). The machine learning model of the stitching model may be trained/configured to detect, identify, and/or classify the frames of the video. In one or more implementations, the stitching model may include a rule-based model using one or more rule-based processes to detect, identify, and/or classify the frames of the video. In one or more implementations, the stitching model may include a computer vision model to detect, identify, and/or classify the frames of the video. Based on one or more of such models, the stitching model may process multiple frames of the video (e.g., the select frames and the additional frames) to predict whether the video has been stitched from multiple data sources and output a first confidence score representing a level of confidence that the video was not stitched.

In some implementations, a second confidence score may be generated. In such implementations, the verification server 104 may receive an image of a second subject (e.g., the user) from the user device 102. The image may be a selfie and/or an image of the user's physical identification (e.g., a driver's license card). In addition to the stitching model, the verification server 104 may also have an identity model that may be trained/configured to detect, identify, and/or classify the image of the second subject. Like the stitching model, the identity model may include a supervised or unsupervised machine learning model, a rule-based model, or a computer vision model to predict whether the first subject and the second subject are matching and output a second confidence score representing a level of confidence that the first subject and the second subject are matching.

At block 508, a request for proofing an identity is generated by the verification server 104. The request may include the first confidence score, the second confidence score, and/or one or more images of the user (e.g., the selfie and the image of the physical identification). This way, when the proofing request is received by the identity issuing server 106, the identity issuing server 106 can be assured that the images in the proofing request are of the person who sent the proofing request, the person who sent the proofing request is the person who performed the gestures in the video, and the video was not stitched to exploit the system.

At block 510, the request for proofing the identity is transmitted to an identity issuing server 106 by the verification server 104. As part of the identity proofing process, the identity issuing server 106 may compare one or more of the images of the user included in the proofing request with an image of the user in a database of the identity issuing server 106 to determine whether the person requesting the digital ID with the proofing request is the same person that owns the ID.

The identity issuing server 106 may also refer to the first and/or second confidence scores to determine whether the one or more images of the user are reliable. That is, the first and second confidence scores demonstrate that the video proving liveness was not tampered with and one or more images are of a living user that initiated the proofing request based on the video proving liveness, respectively. The identity issuing server 106 may decide to further review the proofing request, reject the proofing request, or proceed to provision the digital ID.

In one or more implementations, the identity issuing server 106 may have a first threshold confidence score such that, if the first and/or second confidence scores are below the first threshold confidence score, the proofing request is automatically rejected. In one or more implementations, the identity issuing server 106 may have a second threshold confidence score greater than the first threshold confidence score such that, if the first and/or second confidence scores are below the second threshold confidence score but higher than the first threshold confidence score, the proofing request is automatically flagged for further review (e.g., manual review). In one or more implementations, the identity issuing server 106 may have a third threshold confidence score greater than the first and second threshold confidence scores such that, if the first and/or second confidence scores are above the third threshold confidence score, the proofing request is automatically authorized.

After the identity issuing server 106 authorizes the provisioning of the digital ID to the user device 102, the identity issuing server 106 may provision the data representing the digital ID onto the user device 102 (e.g., via the verification server 104). The provisioned digital ID may be stored, for example, in a secure element of the user device and may be anchored to the user device, such as via a secure enclave processor of the user device.

Figure 6:
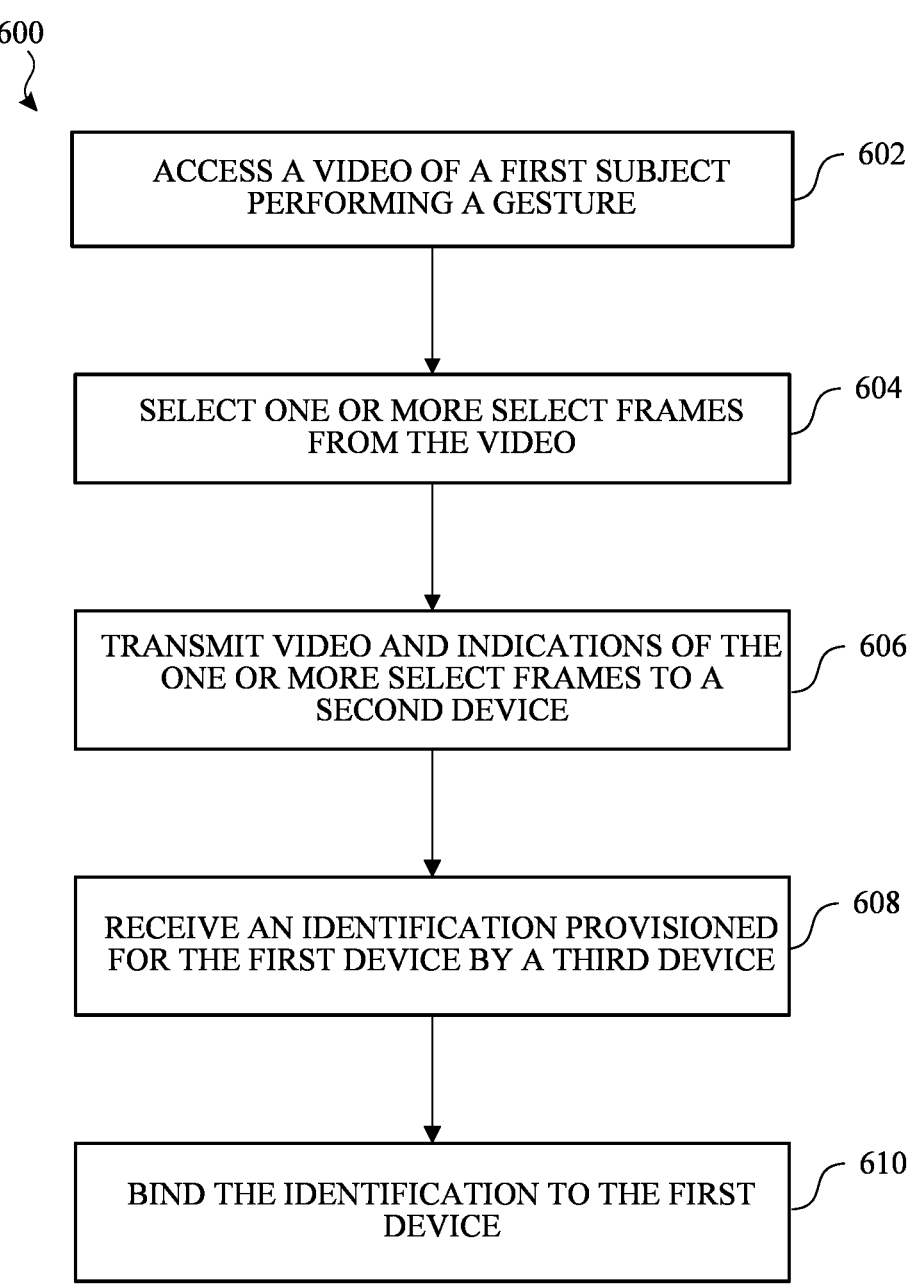
FIG. 6 depicts a flow diagram of an example process for generating data for identity proofing, in accordance with one or more implementations.

FIG. 6 depicts a flow diagram of a process 600 for generating data for identity proofing, in accordance with one or more implementations. For explanatory purposes, the process 600 is primarily described herein with reference to the user device 102, the verification server 104, and identity issuing server 106 of FIG. 1. However, the process 600 is not limited to the user device 102, verification server 104, and/or identity issuing server 106, and one or more blocks (also referred to as steps or operations) of the process 600 may be performed by one or more other components of the identity issuing server 106, and/or by other suitable devices. Further, for explanatory purposes, the blocks of the process 600 are described herein as occurring sequentially or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, a video of a first subject performing a gesture may be accessed by the user device 102. During a digital ID provisioning process, the user device 102 may present a user with an instruction to perform a gesture as part of an assessment of the liveness of the individual making a request for a digital ID. The gesture may be a hand movement, head movement, facial movement, or any other kind of movement. The user device 102 may record the user performing the gesture and/or access the video (e.g., the video 300) from local or remote storage. The first subject is the subject of the video. For example, a camera of the user device 102 may capture and store a video of a user, and the video may be accessed by the user device 102 from local storage (e.g., device memory) or remote storage (e.g., cloud storage). Because the video is of the user, the first subject (i.e., the subject of the video) is the user.

At block 604, one or more select frames from the video may be selected. In one or more implementations, to save computational resources, analysis of the video in a digital ID provisioning process may be limited to portions of the video, particularly one or more select frames. The select frames may be frames of the video that clearly present the face of the first subject. In one or more implementations, the user device 102 may include a machine-learning-based, rules-based, and/or computer-vision-based model trained to detect, identify, and/or classify, orientation, position, and/or movement of a body part (e.g., eyes, face, hand) of the first subject. Based on one or more of such models, the user device 102 may process multiple frames of the video to identify a face of the first subject. The select frames may be one or more of the frames in which the face of the first subject is identified.

In one or more implementations, the select frames may be randomly selected from the video or from portions of the video in which the face of the first subject is identified. In such implementations, the increase in entropy within the digital ID provisioning process may make it more difficult for a malicious user to identify which frames of the video are to be analyzed. Additionally, the one or more select frames may be at least a threshold time between each other. For example, to prevent the random selection of frames from resulting in selecting adjacent frames, which are likely to be nearly identical, a time buffer may be considered such that any pair of select frames are spaced apart from each other by an amount according to the time buffer.

In one or more implementations, the user device 102 may also process multiple frames of the video to identify a gesture performed by the user. In such implementations, the user device 102 may reject the video if the instructed gesture is not detected in the video. For example, if the face of the first subject is detected but the instructed gesture is not, then the user device 102 may request that the video be re-taken.

At block 606, the video and indications of the one or more select frames may be transmitted to a verification server 104. The indications of the one or more select frames may include timestamps, hashes, features, or any other form of data that represents the one or more select frames. In one or more implementations, the indications of the one or more select frames may be cross-referenced with the video to derive the select frames. The verification server 104, which receives the video and the indications, may be a server that analyzes the video and the select frames and/or generates a proofing request for digital ID provisioning. For example, the verification server 104 may analyze the video and/or the select frames then generate a proofing request for digital ID provisioning.

In one or more implementations, an image may be accessed and transmitted to the verification server 104. The user device 102 may access local and/or remote memory for the image. The image may have a subject (referred to herein as the second subject). For example, the user device 102 may capture an image, store the image in local and/or remote memory, and access the image. The user device 102 may also transmit the image to the verification server 104. For example, the user device 102 may transmit the image to the verification server 104 for determining whether the first subject (e.g., from the video) and the second subject (e.g., from the image) are matching. The image and/or the video may be accessed immediately after having been generated to ensure that the user of the user device 102 is the first subject and/or the second subject, respectively. For example, if the user device 102 downloaded the image and saved it in its memory, accessing the video immediately after having been taken and confirming that the subjects of the image and the video are matching may confirm that the subject is the user of the device and that a malicious user is not using images and videos of the user to attempt to trick the digital ID provisioning process into provisioning the identification of the user.

At block 608, an identification provisioned for the user device 102 by an identity issuing server 106 is received. The identity issuing server 106 may be device corresponding to a governmental entity (such as a state entity) that provisions digital identification. Assuming the identity proofing request was approved by at least the identity issuing server 106, the identity issuing server 106 may generate data representing a digital identification to be provisioned on the user device 102. The identity issuing server 106 may provision the data representing the identification on the user device 102 (and/or may provide the data to the verification server 104 for provisioning). For example, the identification may be provisioned on a secure element of the user device 102.

At block 610, the provisioned digital ID may be bound to the user device 102. Binding the digital ID to the user device 102 may include cryptographically tying the digital ID to the user device 102. After the identity issuing server 106 provisions the digital ID, a cryptographic key pair is generated by the user device 102 (e.g., via the secure element of the secure processor 210) that binds the provisioned digital ID to that specific device.

For example, the secure processor 210 of the user device 102 may generate key pair may including a public and a private key. The public key may be sent to the identity issuing server 106, and the identity issuing server 106 may include the public key (or a derivation thereof) as part of the digital ID provisioned to the user device 102.

As described above, one aspect of the present technology is the gathering and use of data available from specific and legitimate sources for identity proofing and digital ID provisioning. The present disclosure contemplates that in some instances, this gathered data may include personal information data that uniquely identifies or can be used to identify a specific person. Such personal information data can include demographic data, location-based data, online identifiers, telephone numbers, email addresses, home addresses, images, videos, audio data, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for identity proofing and digital ID provisioning. Accordingly, the use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of the cryptographic participant vouching, the present technology can be configured to allow users to select to "opt-in" or "opt-out" of participation in the collection of personal information data during registration for services or anytime thereafter. In addition to providing "opt-in" and "opt-out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data.

Figure 7:
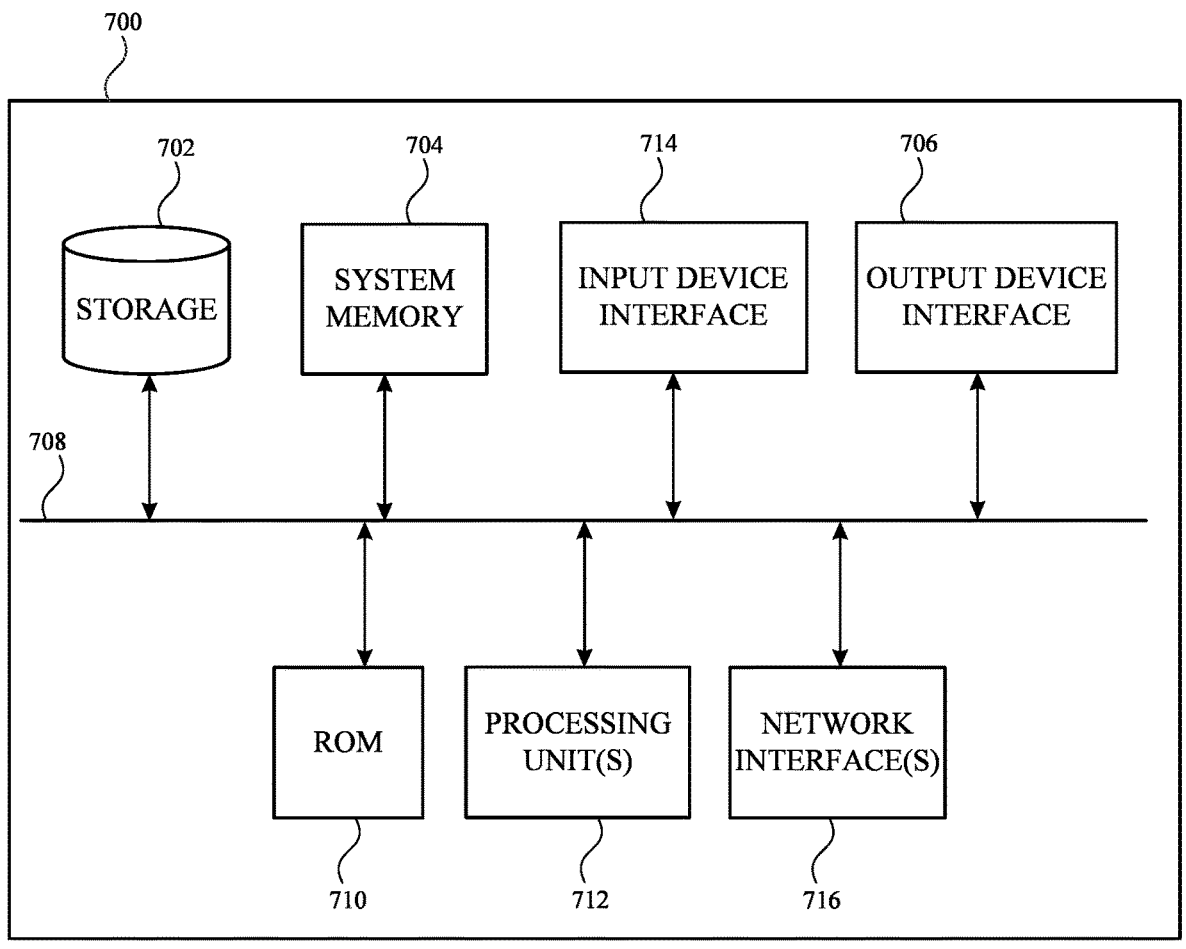
FIG. 7 depicts an example electronic system with which aspects of the present disclosure may be implemented, in accordance with one or more implementations.

FIG. 7 depicts an electronic system 700 with which aspects of the subject technology may be implemented. The electronic system 700 can be, and/or can be a part of, any electronic device for generating the features and processes described in reference to FIGS. 1-6, including but not limited to a laptop computer, tablet computer, smartphone, and wearable device (e.g., smartwatch, fitness band). The electronic system 700 may include various types of computer-readable media and interfaces for various other types of computer-readable media. The electronic system 700 includes one or more processing unit(s) 712, a persistent storage device 702, a system memory 704 (and/or buffer), an input device interface 714, an output device interface 706, a bus 708, a ROM 710, one or more processing unit(s) 712, one or more network interface(s) 716, and/or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the persistent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and machine-readable instructions that are needed by the one or more processing unit(s) 712 and other modules of the electronic system 700. The ROM 710 may include a security subsystem isolated from the one or more processing unit(s) 712 to provide an extra layer of security and is designed to keep sensitive user data, such as digital IDs and user biometrics, secure. The security subsystem may include a boot ROM to establish a hardware root of trust, an AES engine for efficient and secure cryptographic operations, and/or protected memory.

The persistent storage device 702 may be a read-and-write memory device. The persistent storage device 702 may be a non-volatile memory unit that stores instructions and data even when the electronic system 700 is off. In one or more implementations, a mass-storage device (such as a magnetic or optical disk and its corresponding disk drive) may be used as the persistent storage device 702.

In one or more implementations, a removable storage device (such as a floppy disk, flash drive, and its corresponding disk drive) may be used as the persistent storage device 702. Like the persistent storage device 702, the system memory 704 may be a read-and-write memory device. However, unlike the persistent storage device 702, the system memory 704 may be a volatile read-and-write memory, such as RAM. The system memory 704 may store any of the instructions and data that one or more processing unit(s) 712 may need at runtime. In one or more implementations, the processes of the subject disclosure are stored in the system memory 704, the persistent storage device 702, and/or the ROM 710. From these various memory units, the one or more processing unit(s) 712 retrieves instructions to execute and data to process in order to execute the processes of one or more implementations.

The bus 708 also connects to the input device interfaces 714 and output device interfaces 706. The input device interface 714 enables a user to communicate information and select commands to the electronic system 700. Input devices that may be used with the input device interface 714 may include, for example, alphanumeric keyboards, touch screens, and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes through the one or more network interface(s) 716. In this manner, the electronic system 700 can be a part of a network of computers (such as a local area network (LAN), a wide area network (WAN), an Intranet, or a network of networks, such as the Internet). Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed, rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving, by a first device and from a second device, a video of a first subject and indications of one or more frames from the video selected by the second device;
selecting, by the first device, two or more additional frames from the video, wherein the two or more additional frames are selected at non-sequential time intervals relative to the one or more frames selected by the second device and are disjoint from the one or more frames selected by the second device;
generating, by the first device, a first confidence score that the video was captured in a single take based on a comparison between the one or more frames selected by the second device and the two or more additional frames;
generating, by the first device, a request for proofing an identity of the first subject, the request comprising the first confidence score; and
transmitting, by the first device, the request for proofing the identity to a third device.

2. The method of claim 1, further comprising:
receiving, by the first device and from the second device, an image of a second subject; and
generating, by the first device, a second confidence score that the first subject and the second subject are matching, wherein the request for proofing the identity also comprises the image and the second confidence score.

3. The method of claim 1, wherein the two or more additional frames are randomly selected from the video distinct from the indications of one or more frames selected by the second device.

4. The method of claim 1, wherein the two or more additional frames show a face of the first subject.

5. The method of claim 1, wherein the two or more additional frames are at least a threshold time between each other.

6. The method of claim 1, wherein the two or more additional frames are within at least a threshold time from a frame of the one or more frames selected by the second device.

7. The method of claim 1, further comprising receiving, by the first device, an identification from the third device provisioned for the second device, in response to the third device approving the request for proofing the identity of the first subject.

8. The method of claim 7, further comprising transmitting, by the first device, the identification to the second device, in response to receiving the identification from the third device.

9. The method of claim 1, wherein a single take represents the video having been captured in a single, continuous instance of time.

10. The method of claim 1, wherein the video includes the first subject performing a gesture.

11. A method, comprising:
accessing, by a first device, a video of a first subject performing a gesture;
selecting, by the first device, one or more frames from the video; and
transmitting, by the first device, the video and indications of the one or more frames selected by the first device to a second device for the second device to determine a confidence score indicating whether the video was captured in a single take based on a comparison between the one or more frames selected by the first device and two or more additional frames of the video selected by the second device, wherein the two or more additional frames are selected at non-sequential time intervals relative to the one or more frames selected by the first device and are disjoint from the one or more frames selected by the first device.

12. The method of claim 11, further comprising:
accessing, by the first device, an image of a second subject; and
transmitting, by the first device, the image of the second subject to the second device for determining whether the first subject and the second subject are matching.

13. The method of claim 11, wherein accessing the video comprises capturing video data from a camera of the first device.

14. The method of claim 11, wherein the one or more frames selected by the first device are randomly selected from the video.

15. The method of claim 11, wherein the one or more frames selected by the first device show a face of the first subject.

16. The method of claim 11, wherein the one or more frames selected by the first device are at least a threshold time between each other.

17. The method of claim 11, further comprising receiving, by the first device, an identification provisioned for the first device by a third device.

18. The method of claim 17, further comprising binding, by the first device, the identification to the first device.

19. The method of claim 11, wherein the indications of the one or more frames are one or more timestamps of the video corresponding to a respective frame of the one or more frames.

20. A first device, comprising:
a processor; and
a memory storing machine-readable instructions that, when executed by the processor, cause the processor to perform operations comprising:
receiving, by the first device and from a second device, a video of a first subject and indications of one or more frames from the video selected by the second device;
selecting, by the first device, two or more additional frames from the video, wherein the two or more additional frames are selected at non-sequential time intervals relative to the one or more frames selected by the second device and are disjoint from the one or more frames selected by the second device;

generating, by the first device, a confidence score that the video was captured in a single take based on a comparison between the one or more frames selected by the second device and the two or more additional frames;

generating, by the first device, a request for proofing an identity of the first subject, the request comprising the confidence score; and transmitting, by the first device, the request for proofing the identity to a third device.

* * * * *